(12) United States Patent
Hofer (10) Patent No.: US 8,752,669 B2
(45) Date of Patent: Jun. 17, 2014

(54) ADAPTOR FOR SCAFFOLDING (76) Inventor: Tim Hofer, St. Louis, MO (US)

(*) Notice: Subject to any disclaimer, the term of this patent is extended or adjusted under 35 U.S.C. 154(b) by 358 days.

(21) Appl. No.: 12/698,662

(22) Filed: Feb. 2, 2010

(65) Prior Publication Data

US 2011/0188984 A1 Aug. 4, 2011

(51) Int. Cl.
E04G 7/34 (2006.01)
(52) U.S. Cl.
USPC .................................................. 182/178.5
(58) Field of Classification Search
USPC ........................................ 182/178.3–178.6
See application file for complete search history.

(56) References Cited

U.S. PATENT DOCUMENTS

| 2,048,449 | A | * | 7/1936 | Holtzmann | 248/231.41 |
| 3,035,802 | A | * | 5/1962 | Wyman et al. | 248/219.2 |
| 3,070,649 | A | * | 12/1962 | Edlen et al. | 174/75 C |
| 3,261,070 | A | * | 7/1966 | Abolins | 24/287 |
| 4,586,844 | A | * | 5/1986 | Hammonds et al. | 403/287 |
| 5,069,309 | A | * | 12/1991 | Swiderski et al. | 182/119 |
| 5,127,492 | A | * | 7/1992 | Preston | 182/152 |
| 5,197,681 | A | * | 3/1993 | Liebermann | 241/65 |
| 5,285,869 | A | * | 2/1994 | Rock | 182/178.6 |

* cited by examiner

Primary Examiner — Alvin Chin Shue
(74) Attorney, Agent, or Firm — Senniger Powers LLP (57) ABSTRACT An adaptor for attaching a first scaffold having a stack pin to a second scaffold having an opening includes a sleeve having an orifice adapted for receiving the stack pin. An exterior surface of the sleeve includes a tapered section to facilitate insertion of the sleeve into the opening so that the second scaffold can be stacked on top of the first scaffold.

5 Claims, 12 Drawing Sheets

ADAPTOR FOR SCAFFOLDING

FIELD OF THE INVENTION

The present invention generally relates to scaffolding and more particularly to an adaptor for use with scaffolding.

BACKGROUND OF THE INVENTION

Scaffolding is used to support a worker and his/her materials in an elevated position, usually to perform construction or repair on a building or other large structure. Scaffolding typically comprises a modular system of metal pipes. Depending on the desired height of the work space, individual scaffolds which make up the scaffolding may need to be stacked on top of each other to reach the desired work elevation.

Figure 1:
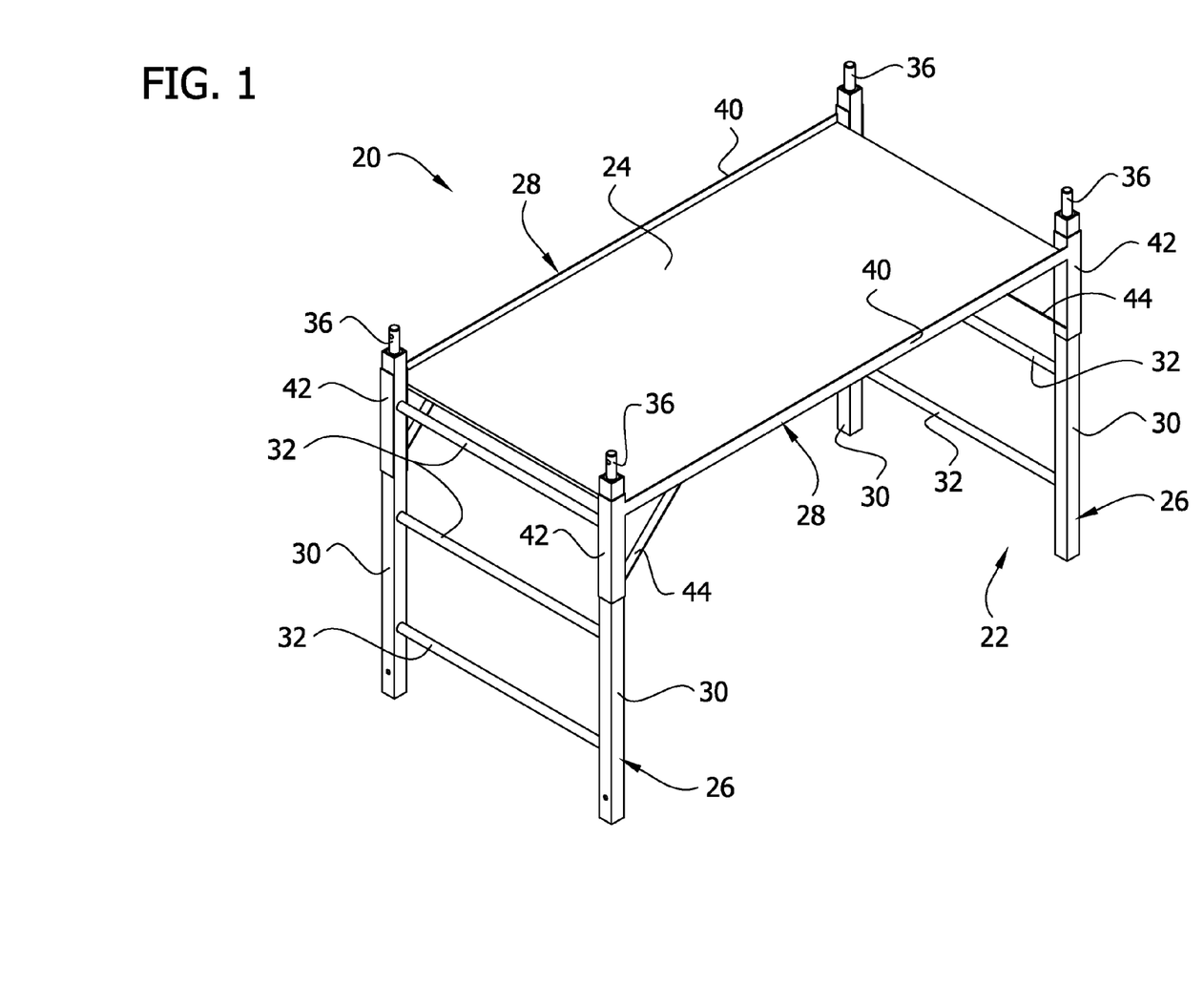
FIG. 1 is a perspective of a Perry-type scaffold.
Figure 3:
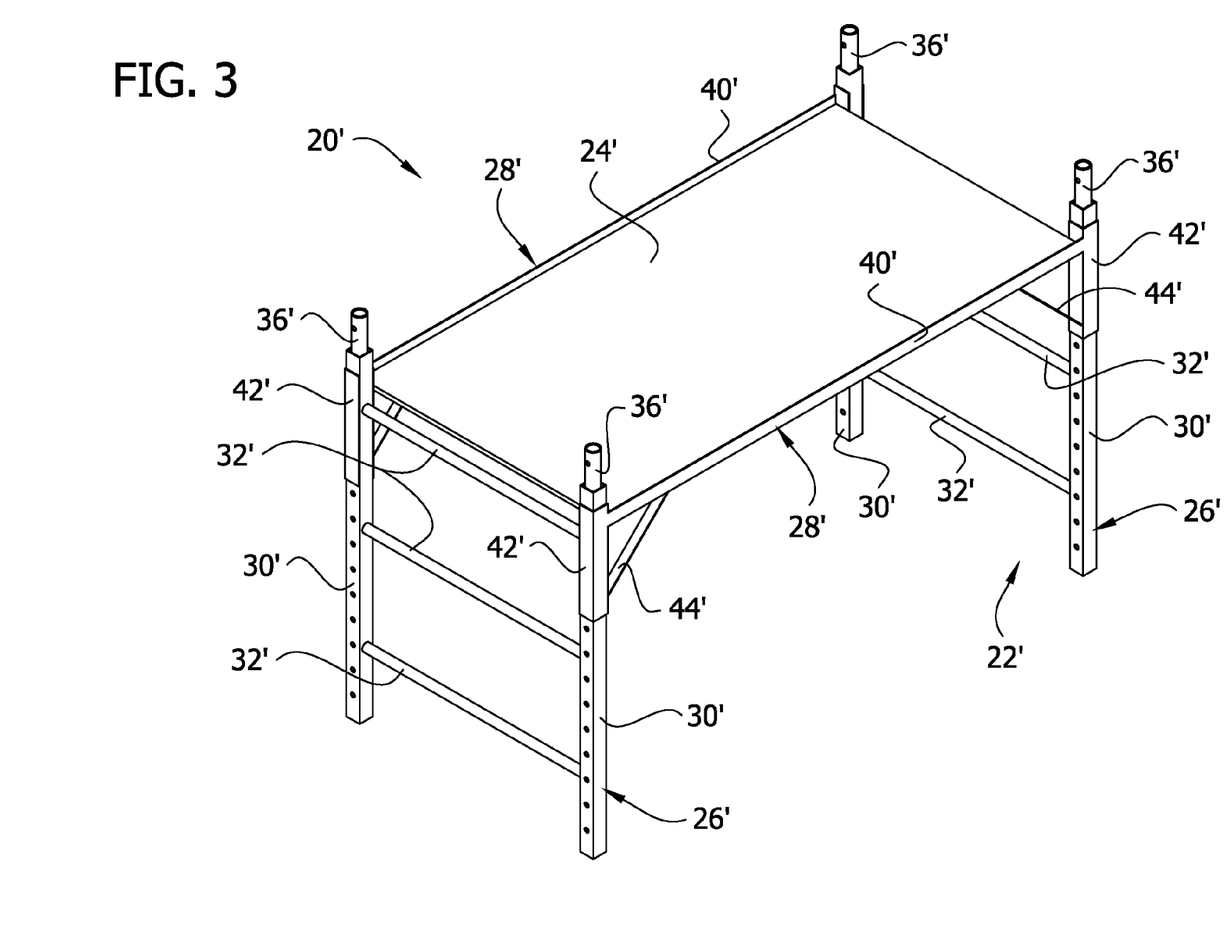
FIG. 3 is a perspective of a Bil-Jax-type scaffold.

There are several types of conventional scaffolding that are commonly used. One type is the "Perry-type" scaffold. A representation of this style scaffold is shown in FIG. 1. Another type is the "Bil-Jax-type" scaffold. A representation of this-type of scaffold is shown in FIG. 3. Because the scaffolds use different connector elements, a Bil-Jax scaffold cannot be stacked on top of a Perry scaffold, or vice versa. There exists a need to permit the stacking of these two different scaffold-types.

SUMMARY OF THE INVENTION

In one aspect, an adaptor for attaching a first scaffold having a stack pin to a second scaffold having an opening generally comprises a sleeve having an orifice adapted for receiving the stack pin and an exterior surface including a tapered section to facilitate insertion into the opening so that the second scaffold can be stacked on top of the first scaffold.

In another aspect, an adaptor for use with scaffolding generally comprises an elongate tubular sleeve having a longitudinal axis. The sleeve includes a first end and a second end disposed generally along the longitudinal axis. The second end is adapted for receiving a stack pin of a first scaffold so that a second scaffold can be placed over the first end of the adaptor to stack the second scaffold on top of the first scaffold. The adaptor further comprises a hole in the sleeve adapted for receiving a set screw therethrough so that the set screw engages the stack pin to secure the adaptor to the stack pin.

In yet another aspect, a method of stacking scaffolding generally comprises placing an adaptor on a stack pin of a first scaffold and inserting the adaptor into an opening in a second scaffold so that the second scaffold stacks on top of the first scaffold.

In still another aspect, an adaptor for use with a scaffold having an opening generally comprises a sleeve adapted for insertion into the opening. The sleeve is configured to receive a support for supporting the scaffold.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

Figure 2:
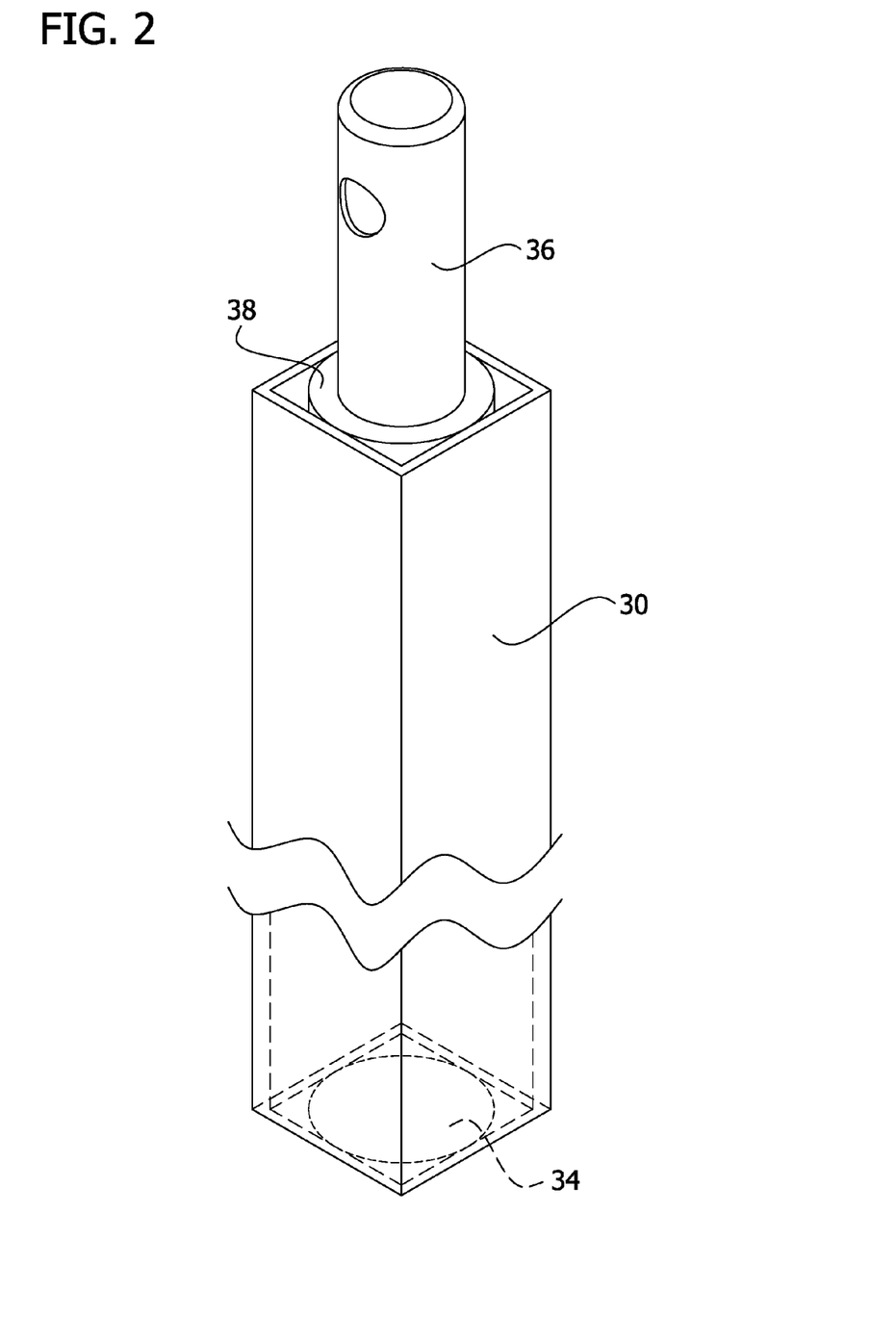
FIG. 2 is an enlarged perspective of a stack pin on a top end of a vertical tube of the Perry-type scaffold.

Referring to FIGS. 1 and 2, a Perry-type scaffold is designated in its entirety by the reference number 20. The Perry scaffold 20 comprises a framework 22 supporting a platform or deck 24 forming a support surface for workers. The framework 22 includes two ladders or end frames 26 joined by trusses 28. Each ladder 26 comprises a plurality vertical tubes 30 joined by a plurality of horizontal tubes 32. A cylindrical receptacle 34 is provided at a lower end of each vertical tube 30 and a cylindrical stack pin 36 extends from an upper end of each vertical tube to join adjacent scaffolds 20 as will be explained in greater detail below. The stack pin 36 includes a shoulder 38 that is approximately even with the top end of the vertical tube 30. Each truss 28 comprises a horizontal support beam 40 having a connector channel 42 mounted on each end for connecting the truss to the corresponding portions of the ladders 26. The truss 28 also includes a brace 44 diagonally joining each connector channel 42 to the support beam 40.

Figure 4:
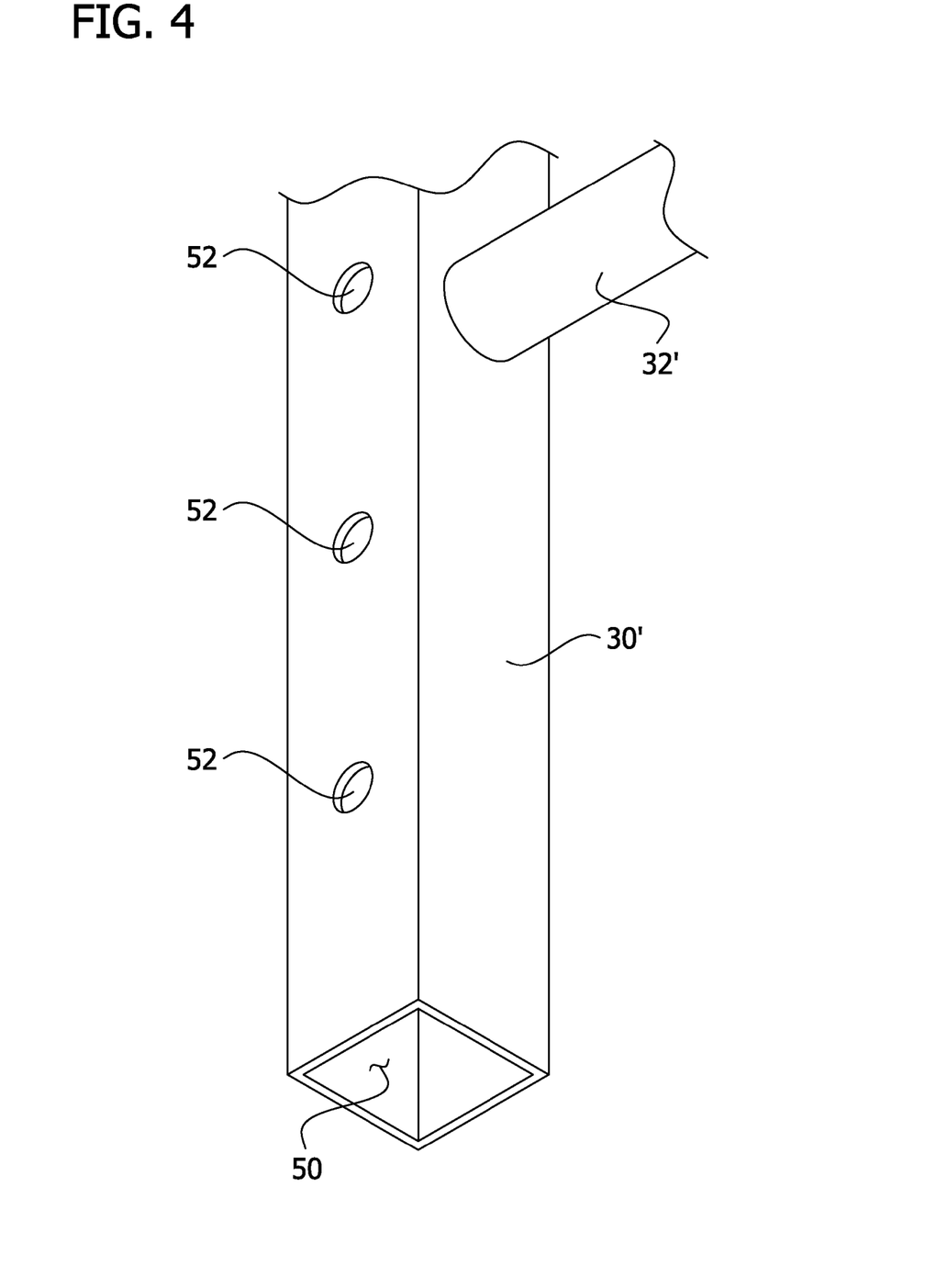
FIG. 4 is an enlarged perspective of a bottom end of a vertical tube of the Bil-Jax-type scaffold.

Referring to FIGS. 3 and 4, a Bil-Jax-type scaffold is generally indicated at 20'. Because the Bil-Jax-type scaffold 20' is generally similar to the Perry-type scaffold 20, similar components of the Bil-Jax-type scaffold will be designated with similar numbers followed by a prime (') symbol. The Bil-Jax scaffold 20' comprises a framework 22' supporting a platform or deck 24' forming a support surface for workers. The framework 22' includes two ladders or end frames 26' joined by trusses 28'. Each ladder 26' comprises a plurality vertical tubes 30' joined by a plurality of horizontal tubes 32'. A square receptacle 50 is provided at a lower end of each vertical tube 30' and a cylindrical stack pin 36' extends from an upper end of each vertical tube to join adjacent scaffolds 20' as will be explained in greater detail below. The vertical tubes 30' also have a series of holes 52 extending through the tubes for accepting connectors (not shown) as will be explained in further detail below. Each truss 28' comprises a horizontal support beam 40' having a connector channel 42' mounted on each end for connecting the truss to the corresponding portions of the ladders 26'. The truss 28' also includes a brace 44' diagonally joining each connector channel 42' to the support beam 40'.

Both the Perry scaffold 20 and the Bil-Jax scaffold 20' may include other conventional components such as outriggers, casters, and guard rails without departing from the scope of the present invention. As these components are well known by those skilled in the art, they will not be described in further detail.

Typically, scaffolds of a similar-type are stacked on top of one another by inserting the stack pins on the tops of the vertical tubes into the receptacles in the bottoms of the vertical tubes. Although the Perry stack pins 36 fit in the Bil-Jax receptacles 50, it is not recommended to stack Bil-Jax scaffolds 20' on Perry scaffolds 20 because the fit is loose and the stacked scaffolds will be unstable. Bil-Jax receptacles 50 have a width of about 33 mm, and Perry stack pins 36 have an outer diameter of about 25.4 mm.

Figure 5:
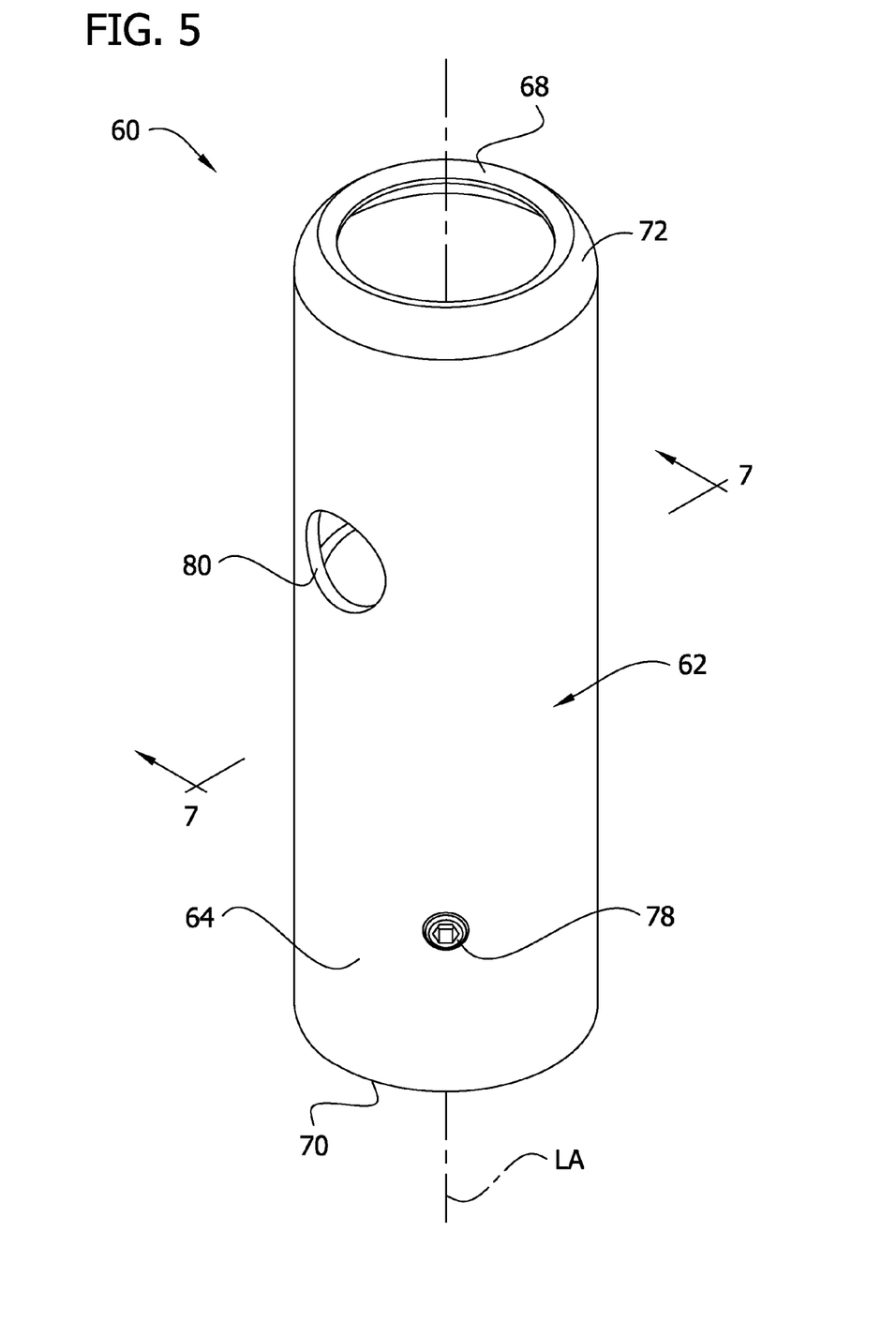
FIG. 5 is a perspective of an adaptor of the present invention.
Figure 6:
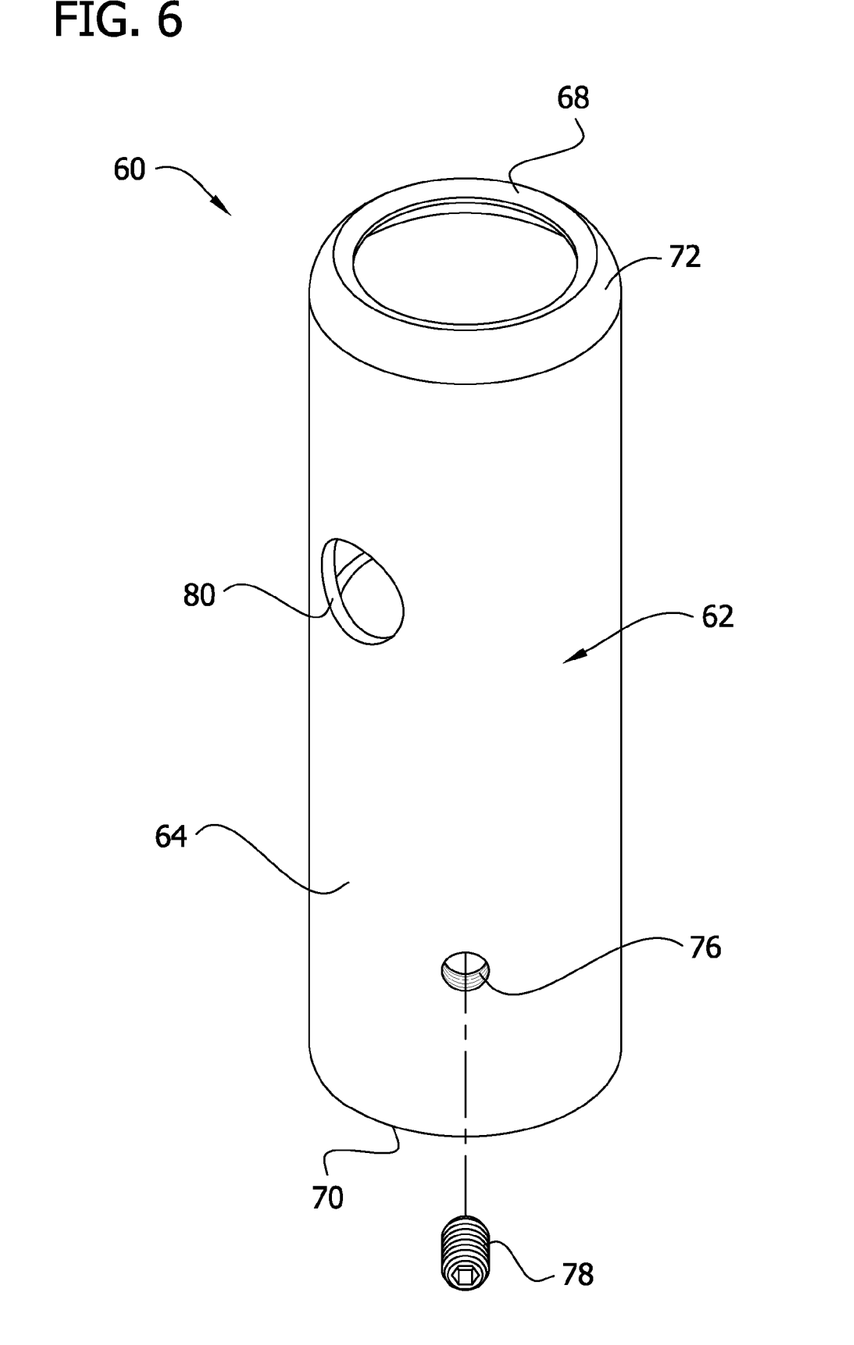
FIG. 6 is a separated view of the adaptor.
Figure 7:
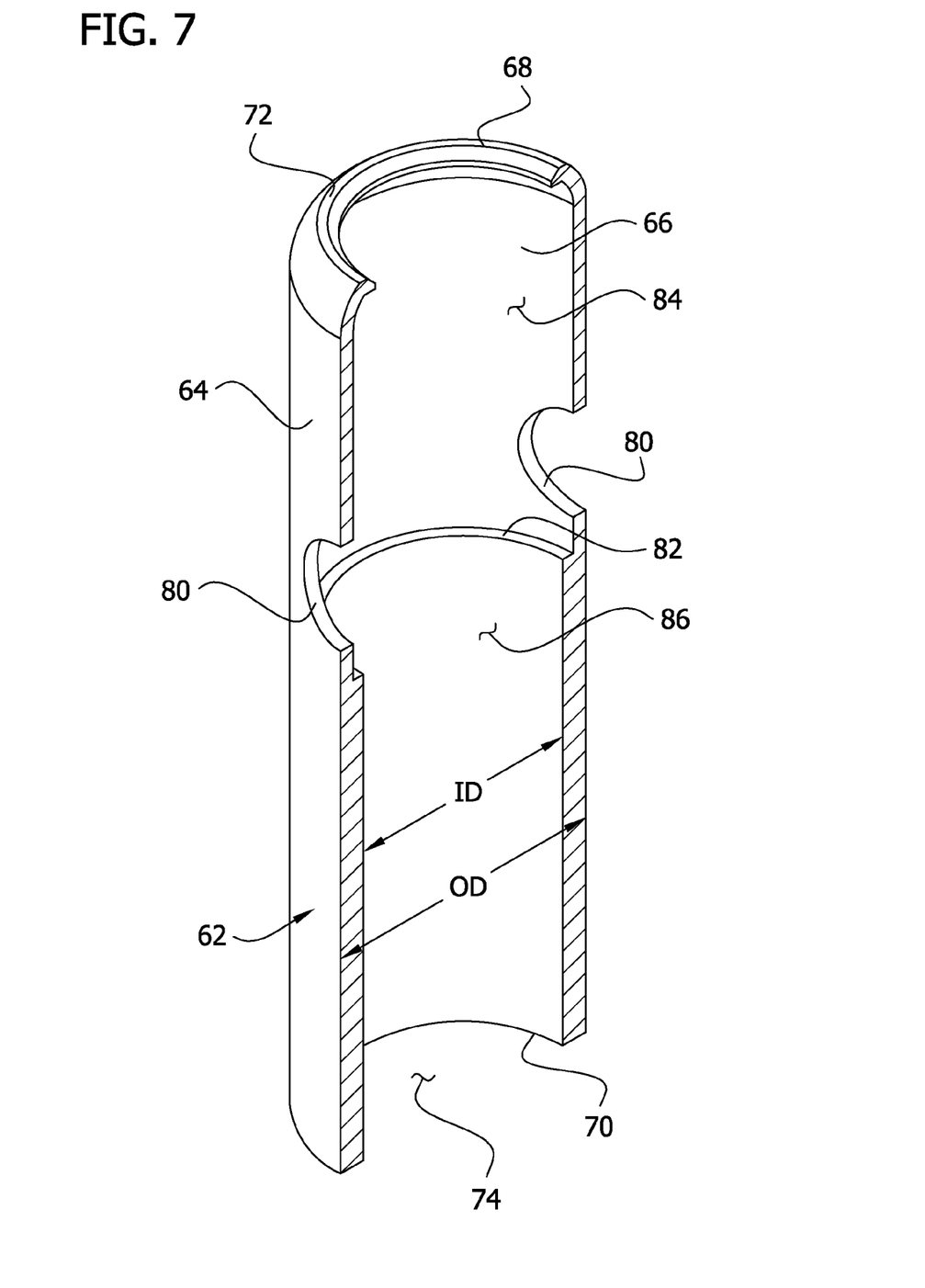
FIG. 7 is a cross section of the adaptor taken through line 7-7 in FIG. 5.
Figure 9:
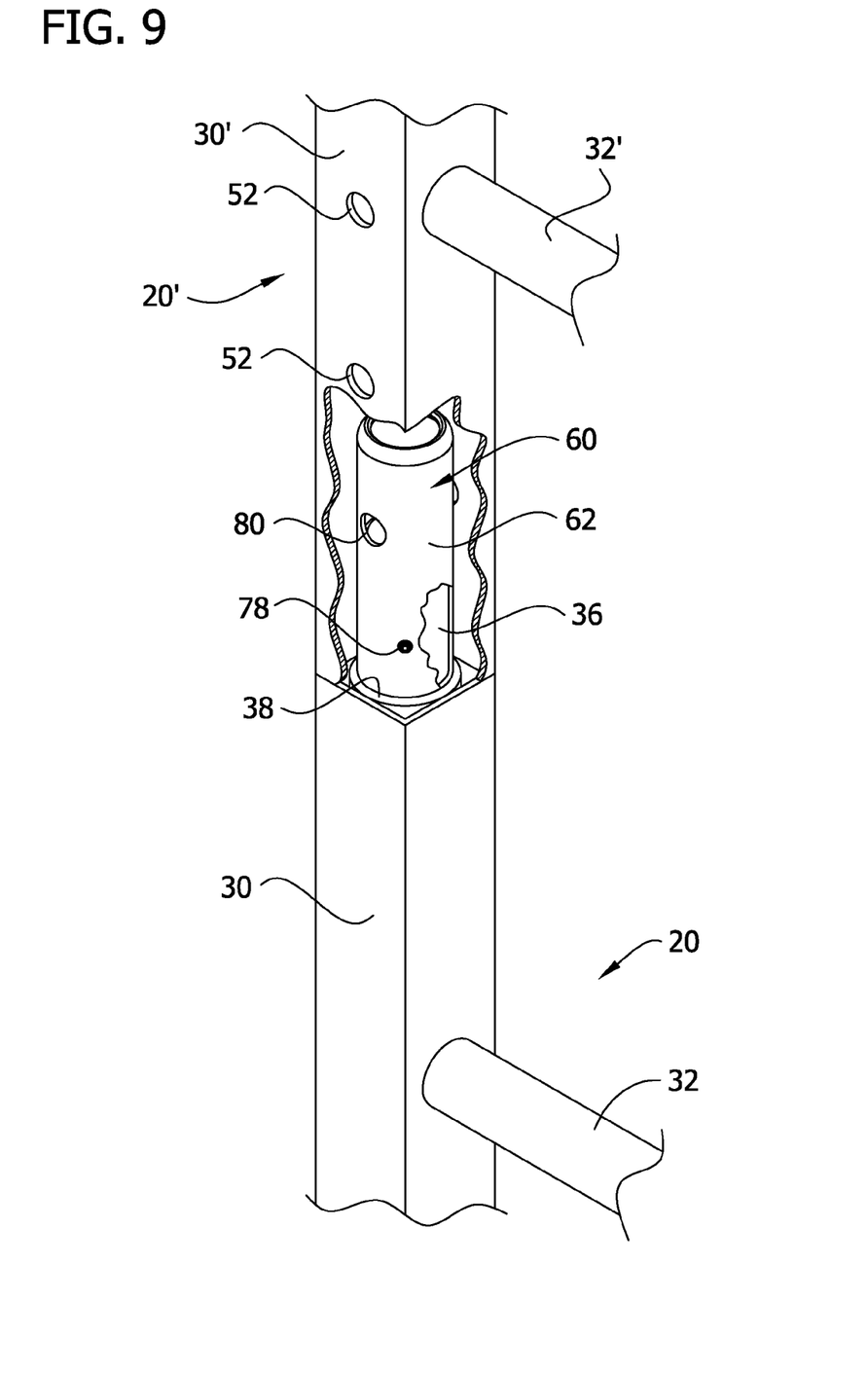
FIG. 9 is a an enlarged view of the perspective of FIG. 8 with a portion of a vertical tube of the Bil-Jax scaffold broken away to show the adaptor and a portion of the adaptor broken away to show the stack pin on the Perry scaffold.

Referring to FIGS. 5-7, an adaptor of the present invention is indicated generally at 60. The adaptor comprises an elongate tubular sleeve 62 having an imaginary central longitudinal axis LA. The sleeve 62 includes an exterior surface 64 and an interior surface 66 extending between a top end 68 and a bottom end 70. A tapered section 72 is provided adjacent the top end 68 for guiding the adaptor 60 into receptacle 50 as will be explained below. Although the tapered section 72 may have other shapes without departing from the scope of the present invention, in one embodiment the tapered section comprises a rounded portion. An orifice 74 is provided at the bottom end 70 of the adapter 60 for receiving stack pin 36 (FIG. 9). Although the sleeve 62 could be formed with a closed top end, in one embodiment the orifice extends entirely through the sleeve to the top end 68. A threaded hole 76 is provided in the sleeve 62 for receiving a set screw 78 to fasten the sleeve to stack pin 36. Diametrically aligned connector holes 80 extend through the sleeve for receiving a connector as will be explained below. In one embodiment, the connector holes 80 are located in an upper half of the sleeve 62 and the threaded hole 76 is located in a lower half of the sleeve.

Referring specifically to FIG. 7, the sleeve 62 has an outer diameter OD of about 32 mm. The interior surface 66 of the sleeve 62 comprises a shoulder 82 separating the sleeve 62 into an upper 84 and a lower portion 86. The lower portion has an inner diameter ID of about 26 mm.

Figure 8:
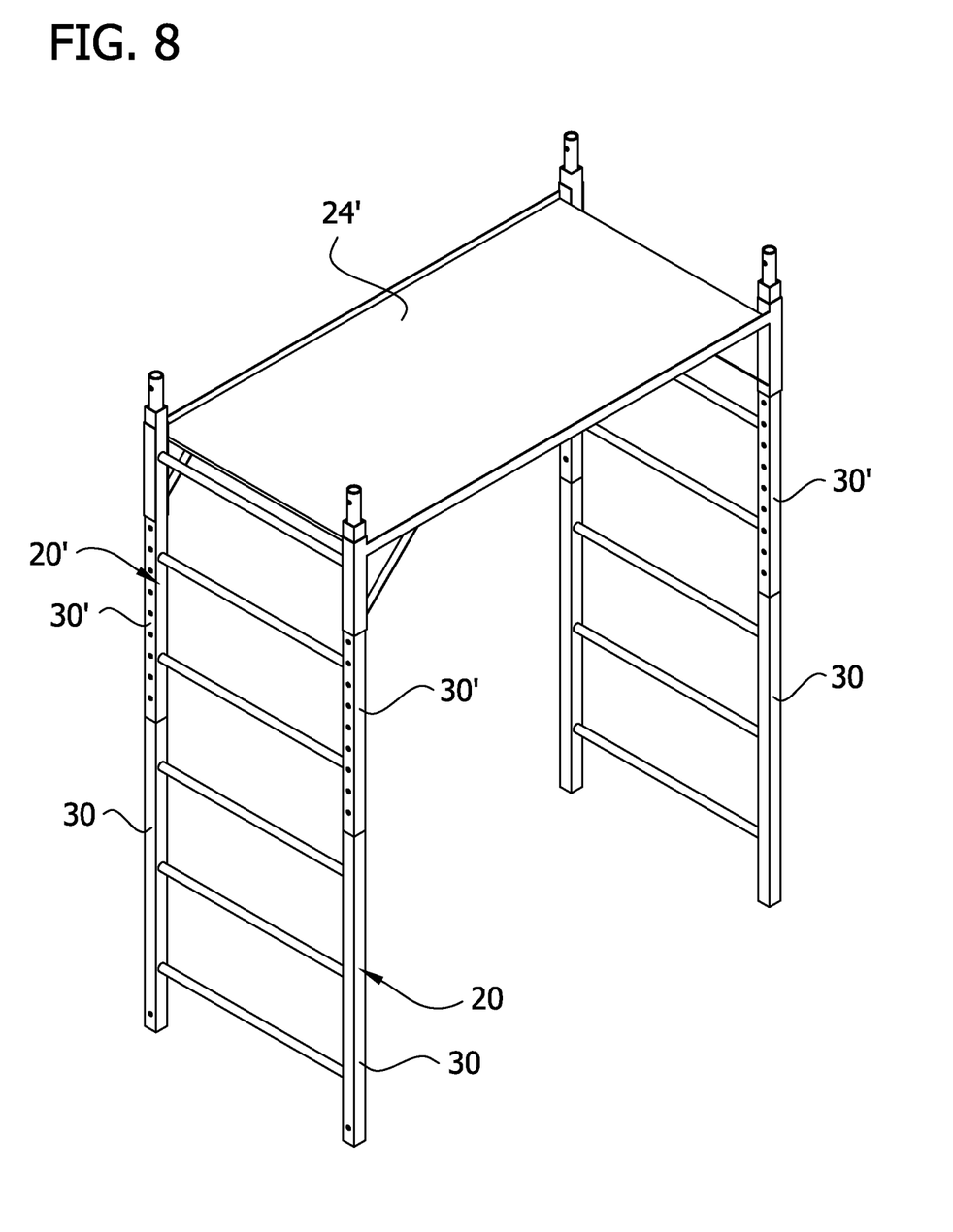
FIG. 8 is a perspective of the Bil-Jax-type scaffold stacked on top of the Perry-type scaffold.

Referring to FIGS. 8 and 9, the sleeve 62 is configured to fit over the stack pin 36 on the Perry-type scaffold 20. The stack pin 36 is received in the orifice 74 at the bottom end 70 of the sleeve 62 so the bottom end is supported on the shoulder 38. The inner diameter ID of the lower portion 86 of the sleeve 62 is sized to fit snugly around the stack pin 36. In particular, there is a radial clearance of about 0.2 mm between the inner diameter ID of the lower portion 86 and an exterior surface of the stack pin 36 of the Perry scaffold 20. The set screw 78 received in the threaded hole 76 in the sleeve 62 may be tightened to engage the stack pin 36 to secure the adaptor 60 to the stack pin.

At this point the Bil-Jax scaffold 20' can be stacked on top of the Perry-type scaffold 20 by placing the vertical tubes 30' of the Bil-Jax scaffold over the sleeves 62. The tapered section 72 of the sleeves 62 facilitate insertion into the receptacles 50 in the vertical tubes 30'. The larger outer diameter OD of the sleeves 62 is sized to match the outer diameter of a typical Bil-Jax stack pin 36', thus converting the Perry scaffold stack pin 36 into one suited for mating with the Bil-Jax scaffold 20'. Once stacked, the connector holes 80 in the sleeves 62 line up with holes 52 in the vertical tubes 30' of the Bil-Jax scaffold 20' so that a locking pin connector (not shown) can be inserted to lock the scaffolds together.

Figure 10:
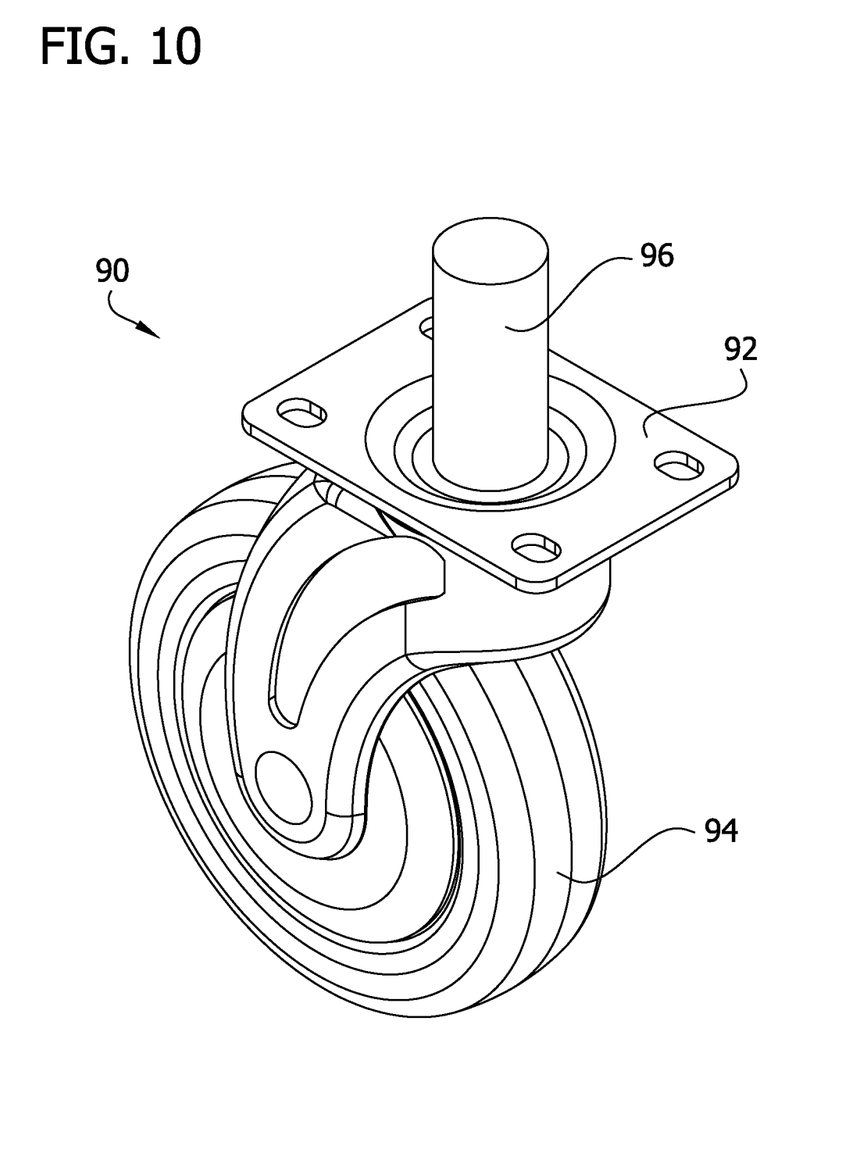
FIG. 10 is a perspective of a Kingpin caster.
Figure 11:
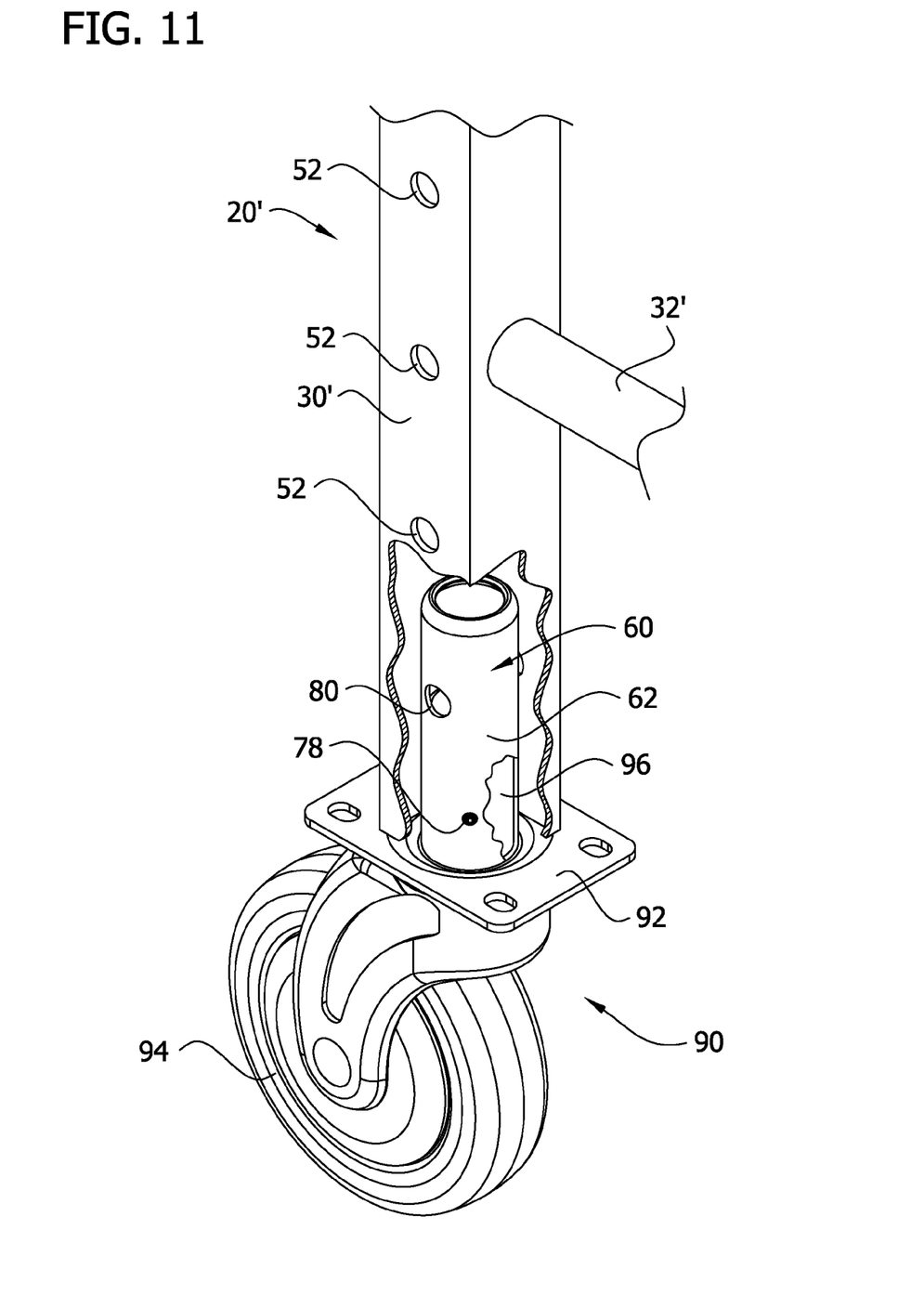
FIG. 11 is a perspective of the Kingpin caster attached to the bottom end of a vertical tube the Bil-Jax-type scaffold, a portion of the vertical tube is broken away to show the adaptor and a portion of the adaptor is broken away to show a stack pin of the caster.
Figure 12:
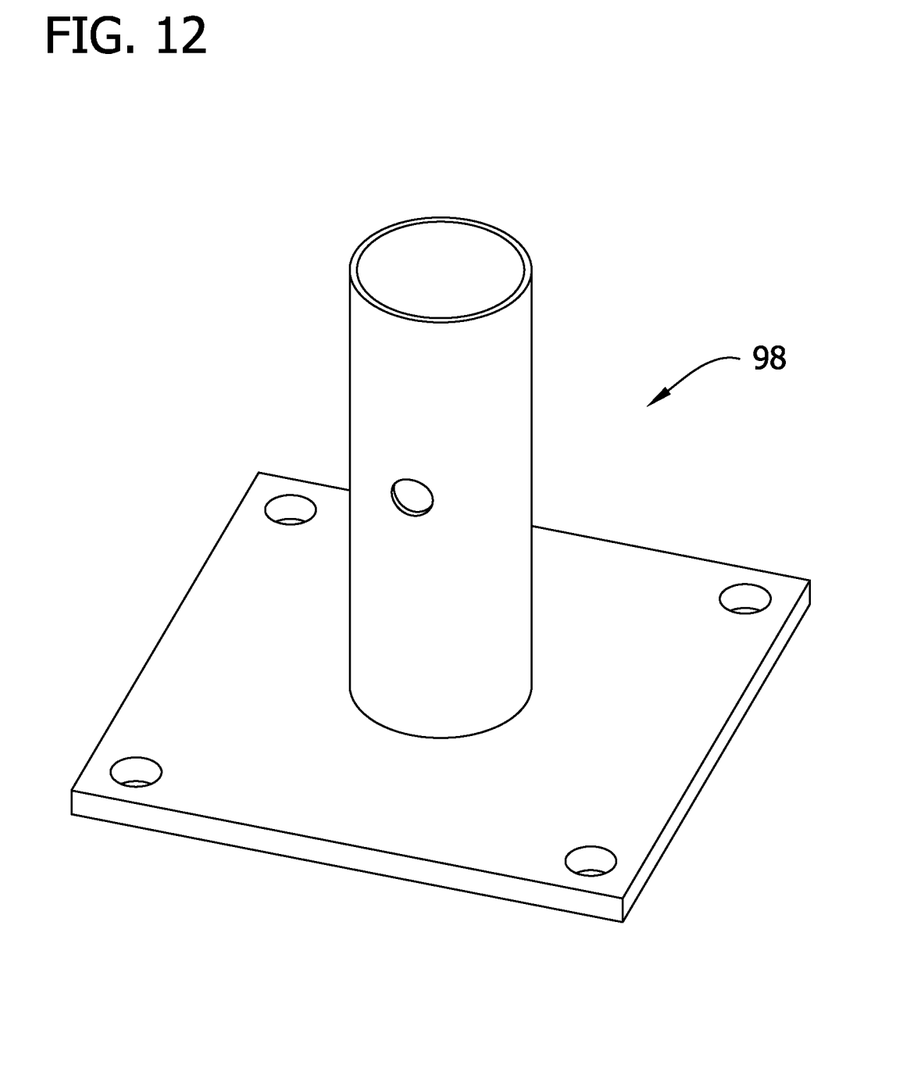
FIG. 12 is a perspective of a base plate.

Referring to FIGS. 10-12, a Kingpin caster is indicated generally at 90. The caster comprises a base 92 attaching a wheel 94 and a stack pin 96. These casters are intended for use with the Perry-type scaffold 20. The stack pin 96 is sized similarly to the stack pins 36 on the Perry scaffold 20 making them compatible for insertion into receptacles 34 in the bottom of the vertical tubes 30 of the Perry scaffold. The adaptor 60 of the present invention can also modify the Kingpin caster 90 to make it suitable for use with a Bil-Jax scaffold 20'. Similar to the description above, the adaptor 60 is configured to receive the stack pin 96 on the caster 90 in the orifice 74 at the bottom end 70 of the sleeve 62. Once secured to the stack pin 96 using the set screw 78, the sleeve 62 can be inserted into the opening 50 in the vertical tube 30' of the Bil-Jax scaffold 20'. The connector holes 80 in the sleeve 62 will align with holes 52 in the Bil-Jax scaffold 20' so that a locking pin connector (not shown) can be inserted to lock the caster 90 to the scaffold. The adaptor 60 will also receive a Perry foot or base plate 98 (FIG. 12).

Having described the invention in detail, it will be apparent that modifications and variations are possible without departing from the scope of the invention defined in the appended claims.

When introducing elements of the present invention or the preferred embodiments(s) thereof, the articles "a", "an", "the", and "said" are intended to mean that there are one or more of the elements. The terms "comprising", "including", and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A scaffold assembly comprising:
a first scaffold having a stack pin;
a second scaffold having an opening; and
an adaptor attaching the first scaffold to the second scaffold, the adaptor comprising a sleeve having a first end, a second end, and an orifice at the second end receiving the stack pin, an exterior surface including a tapered section at the first end inserted into the opening to stack the second scaffold on top of the first scaffold, and a threaded hole in the sleeve adapted for receiving a set screw therethrough so that the set screw engages the stack pin received in the orifice to secure the adaptor to the stack pin, the threaded hole comprising a first hole, the sleeve including a second hole positioned for alignment with a hole in the second scaffold so that a pin can be received through the hole in the second scaffold and the second hole in the sleeve to secure the second scaffold to the adaptor, the sleeve having an interior surface and a shoulder formed in the interior surface separating the sleeve into upper and lower portions, the lower portion having an inner diameter smaller than an inner diameter of the upper portion.

2. An assembly as set forth in claim 1 further comprising a radial clearance of about 0.2 mm between the inner diameter of the lower portion the sleeve and an exterior surface of the stack pin.

3. An assembly as set forth in claim 2 wherein said lower portion of the sleeve has an inner diameter of about 26 mm.

4. An assembly as set forth in claim 3 wherein at least a portion of the sleeve has an outer diameter of about 32 mm.

5. An assembly as set forth in claim 1 in combination with the set screw, the set screw having a threaded exterior surface for mating with the threaded hole in the sleeve to secure the adapter to the stack pin.

* * * * *